United States Patent
Hodel

(10) Patent No.: US 9,510,587 B1
(45) Date of Patent: Dec. 6, 2016

(54) ANIMAL TRAP

(71) Applicant: Randy H. Hodel, Grand Marais, MN (US)

(72) Inventor: Randy H. Hodel, Grand Marais, MN (US)

( * ) Notice: Subject to any disclaimer, the term of this patent is extended or adjusted under 35 U.S.C. 154(b) by 193 days.

(21) Appl. No.: 14/469,533

(22) Filed: Aug. 26, 2014

(51) Int. Cl.
*A01M 23/24* (2006.01)
*A01M 23/30* (2006.01)

(52) U.S. Cl.
CPC .............. *A01M 23/24* (2013.01); *A01M 23/30* (2013.01)

(58) Field of Classification Search
CPC ................................ A01M 23/24; A01M 23/30
See application file for complete search history.

(56) References Cited

U.S. PATENT DOCUMENTS

| | | | |
|---|---|---|---|
| 391,118 A | 10/1888 | Castle | |
| 1,176,778 A | * 3/1916 | Rittelmann | ........... A01M 23/30 43/81 |
| 1,446,715 A | 2/1923 | Mertz et al. | |
| 1,507,532 A | * 9/1924 | Vickers | ................. A01M 23/30 43/81 |
| 1,511,123 A | 10/1924 | Hart | |
| 1,753,814 A | 4/1930 | Weller | |
| 1,794,463 A | 3/1931 | Kelp | |
| 1,798,541 A | * 3/1931 | Kleffman | .............. A01M 23/30 43/62 |
| 1,919,527 A | 7/1933 | Orr | |
| 1,987,831 A | 1/1935 | Kleffman | |
| 1,992,353 A | 2/1935 | Cattanach | |
| 2,068,492 A | 1/1937 | Johnson | |
| 2,068,508 A | 1/1937 | Orr | |
| 2,138,092 A | 11/1938 | Evans | |
| 2,174,929 A | 10/1939 | Slutz | |
| 2,209,522 A | 7/1940 | Houtsinger et al. | |
| 2,321,617 A | 6/1943 | Peterson | |
| 2,595,809 A | 5/1952 | Oxley | |
| 2,724,209 A | 11/1955 | Cain | |
| 2,778,149 A | 1/1957 | Edwards | |
| 3,374,571 A | 3/1968 | Oakes | |
| 4,662,102 A | 5/1987 | Marcolina | |
| 4,665,644 A | 5/1987 | Vajs et al. | |

(Continued)

OTHER PUBLICATIONS

"The Better Mousetraps", Aug. 8, 2014, HTTP;//www.intruderinc.com/products.asp?CategoryName—The Better Mousetrap &TopCat=Rodent, Intruder, Inc., Rice Lake, WI, 1 page.

(Continued)

*Primary Examiner* — Gary Hoge
(74) *Attorney, Agent, or Firm* — Albert W. Watkins

(57) ABSTRACT

An animal trap has a fixed jaw that serves as a base, and an opposed moveable jaw that operatively closes down upon the base. A trigger is provided between the base and moveable jaw. A bait holder is provided within the moveable jaw, most preferably at a location that requires a rodent or other animal to step upon the trigger while both raising their head and twisting their neck to try to reach the bait. The trigger may be covered with a set of posts that are sized and spaced from each other to prohibit any flat placement of paws onto the trigger, thereby forcing the animal to grasp the post tops, while allowing a paw to slip between and potentially be trapped by adjacent posts if the animal tries to move suddenly.

14 Claims, 5 Drawing Sheets

(56) References Cited

U.S. PATENT DOCUMENTS

| | | | |
|---|---|---|---|
| 4,677,786 A * | 7/1987 | Frank | A01M 23/30 43/82 |
| 4,803,799 A | 2/1989 | Vajs et al. | |
| 4,991,340 A * | 2/1991 | Schildt | A01M 23/30 43/81 |
| D320,833 S | 10/1991 | Lumsden | |
| D323,016 S | 1/1992 | Vajs | |
| 5,337,512 A | 8/1994 | Krenzler | |
| 5,960,583 A * | 10/1999 | Hansson | A01M 23/28 43/81 |
| D441,828 S | 5/2001 | Leyerle et al. | |
| 6,415,544 B1 * | 7/2002 | Leyerle | A01M 23/24 43/82 |
| 6,508,031 B1 | 1/2003 | Johnson et al. | |
| D532,478 S | 11/2006 | Wiesener et al. | |
| 7,712,246 B2 | 5/2010 | Desmither | |
| D616,958 S | 6/2010 | Huang | |
| 7,954,275 B2 | 6/2011 | Frisch | |
| 8,104,222 B2 | 1/2012 | Hovey | |
| D671,186 S | 11/2012 | Dobias et al. | |
| D671,614 S | 11/2012 | Dobias et al. | |
| D676,098 S | 2/2013 | Huang | |
| 8,490,322 B2 | 7/2013 | Dobias et al. | |

OTHER PUBLICATIONS

"Tomcat Mouse Snap Trap", Aug. 8, 2014, HTTP;//www.tractorsupply.com/en/store/tomcatreg%3B-mouse-snap-trap-pack-of-2, Tractor Supply Company, 2 pages.

* cited by examiner

ANIMAL TRAP

BACKGROUND OF THE INVENTION

1. Field of the Invention

The present invention pertains generally to the field of fishing, trapping, and vermin destroying, and more particularly to animal traps that smite an animal using a fixed jaw and swinging striker activated by a trigger. Traps designed in accord with the teachings of the present invention find utility with a variety of animals, including rodents such as mice, rats, voles; and to other similar animals such as but not limited to shrews.

2. Description of the Related Art

Rodents and similar animals have long existed in the proximity of humans, often thriving on discarded garbage, scraps and crumbs. Unfortunately, these animals may also consume, devour or destroy foods; merchandise; building components such as walls, wiring and insulation; and other property that would otherwise be useful, beneficial and valuable to mankind. They will also soil buildings, and may contaminate food. Furthermore, these animals may become infected with diseases that are transmittable to humans and which have in some instances caused plagues and epidemics of enormous consequence.

While cats and other domesticated animals have been used to control populations of rodents and other wild animals, these domesticated animals will only rarely be able to completely eliminate such a population. Various chemicals are used to control pestilent wild animal populations, such as baits incorporating poisons or blood thinners. However, the use of chemicals poses a risk to children and pets, and can be dispersed by rodents into human foods. Furthermore, when the rodent dies, they may do so in an inaccessible nest and there may then be an associated stench as the carcass decays.

Instead, or in concert with other techniques, most people prefer to set up mechanical traps to control rodent and similar pest populations. The mechanical traps are preferably of low cost, may be reusable, preferably allow for easy removal of carcasses, and can provide simple monitoring of pest populations.

A few exemplary and relatively generic US patents, the teachings and contents which are incorporated herein by reference, include: U.S. Pat. No. 391,118 by Castle, entitled "Animal trap"; U.S. Pat. No. 4,662,102 by Marcolina, entitled "Disposable rodent trap"; Des 616,958 by Huang, entitled "Mouse trap"; and Des 676,098 by Huang, entitled "Mousetrap". Wire traps, such as illustrated by Castle, can be quite difficult to set, and tend to be surprisingly unreliable at capturing rodents and the like. Furthermore, these types of traps are quite non-selective, and tend to capture clothing, children and domestic pets. Other drawbacks to common mechanical traps include difficulty setting the trap, a risk of bleeding or soiling that contaminates the trap and surroundings, difficulty removing a carcass from the trap, low capture rates, loss of bait from the trap, and sensitivity of the trap trigger to vibrations or movements.

A number of artisans have designed jaw traps with catches that at least in some cases improve selectivity of the trap, and that may also be easier to set and release. Some exemplary US patents, the teachings and contents which are incorporated herein by reference, include: U.S. Pat. No. 1,446,715 by Mertz et al, entitled "Animal trap"; U.S. Pat. No. 1,753,814 by Weller, entitled "Trap"; U.S. Pat. No. 1,919,527 by Orr, entitled "Trap"; U.S. Pat. No. 2,068,492 by Johnson, entitled "Animal trap"; U.S. Pat. No. 2,068,508 by Orr, entitled "Animal trap"; U.S. Pat. No. 2,321,617 by Peterson, entitled "Mousetrap"; U.S. Pat. No. 2,724,209 by Cain, entitled "Animal trap"; U.S. Pat. No. 2,778,149 by Edwards, entitled "Animal trap"; U.S. Pat. No. 4,665,644 by Vajs et al, entitled "Mouse and rat trap"; U.S. Pat. No. 4,803,799 by Vajs et al, entitled "Mouse and rat trap"; U.S. Pat. No. 5,337,512 by Krenzler, entitled "Mouse trap"; U.S. Pat. No. 6,508,031 by Johnson et al, entitled "Rodent trap with removable bait container"; U.S. Pat. No. 7,954,275 by Frisch, entitled "Rodent trap with removable trigger plate"; U.S. Pat. No. 8,490,322 by Dobias et al, entitled "Animal trap with collapsible arm"; Des 320,833 by Lumsden, entitled "Mouse trap"; Des 532,478 by Wiesener et al, entitled "Trap for rodents, in particular for mice and rats"; Des 671,186 by Dobias et al, entitled "Animal trap"; and Des 671,614 by Dobias et al, entitled "Animal trap". These traps still suffer from the need to properly engage the catch, and in some cases from increased complexity and more unpredictable release due to the catch.

A particular subset of traps, and to which the present invention is most preferably applied, uses an over-center jaw trap which does not include any additional catch structure. These traps use a spring and pivot, with the spring moving from one side of the pivotal axis to centered with the axis, and finally to the other side of the axis. This causes the trap to be stable when the spring is on either side of the pivotal axis. A person can then manually swing the trap from open to closed or vice-versa. Exemplary US patents, the teachings and contents which are incorporated herein by reference, include: U.S. Pat. No. 2,138,092 by Evans, entitled "Animal trap"; U.S. Pat. No. 2,174,929 by Slutz, entitled "Animal trap"; U.S. Pat. No. 3,374,571 by Oakes, entitled "Trap"; U.S. Pat. No. 4,991,340 by Schildt, entitled "Animal trap"; U.S. Pat. No. 6,415,544 by Leyerle et al, entitled "Rodent trap with entrapping teeth"; Des 323,016 by Vajs, entitled "Combined mouse and rat trap"; and Des 441,828 by Leyerle et al, entitled "Rodent trap". These traps tend to be much more safe around children and domestic pets. They also may be reusable, and can be designed to suffocate the rodent without breaking skin. Another particular advantage is the ability to release the carcass by simply squeezing the trap distal to the active jaw portion.

Unfortunately, one problem with these traps is the ability for rodents of different size from ideal escaping the jaws. Another problem is the sensitivity of the rodent to vibration when the trap starts to snap shut. The bait is placed adjacent to the base or fixed jaw, and so the rodent is somewhat crouched to eat. This is the most favorable position for the rodent, since the rodent can then quickly straighten his legs to jump out of the way of an incoming trap jaw.

Once again, some artisans have contemplated moving the bait to different locations. Exemplary US patents, the teachings and contents which are incorporated herein by reference, include: U.S. Pat. No. 1,511,123 by Hart, entitled "Weasel trap"; U.S. Pat. No. 1,794,463 by Kelp, entitled "Animal trap"; U.S. Pat. No. 1,798,541 by Kleffman, entitled "Trap"; U.S. Pat. No. 1,987,831 by Kleffman, entitled "Trap"; U.S. Pat. No. 1,992,353 by Cattanach, entitled "Vermin trap"; U.S. Pat. No. 2,209,522 by Houtsinger et al, entitled "Animal trap"; U.S. Pat. No. 2,595,809 by Oxley, entitled "Attachment for animal traps"; U.S. Pat. No. 7,712,246 by Desmither, entitled "Vertical rodent trap"; and U.S. Pat. No. 8,104,222 by Hovey, entitled "Animal trap".

One additional patent, U.S. Pat. No. 4,677,786 by Frank, entitled "Small animal trap with multifingered bait holder", illustrates a multifingered trigger that is designed to resist bait removal.

In addition to the foregoing patents, Webster's New Universal Unabridged Dictionary, Second Edition copyright 1983, is also incorporated herein by reference in entirety for the definitions of words and terms used herein.

SUMMARY OF THE INVENTION

In a first manifestation, the invention is an animal trap. A base operatively rests upon a support and defines a fixed jaw. A moving jaw is above and pivotally coupled with the fixed jaw. A spring is engaged with the fixed jaw and distal thereto is engaged with the moving jaw. The spring is adapted to operatively apply a closure force to move the moving jaw towards the fixed jaw when the moving jaw is in at least a first position. A step trigger is located between the moving jaw and fixed jaw, to selectively trigger application of the closure force responsive to being stepped upon by the animal. A bait support is coupled with the moving jaw and faces the step trigger.

In a second manifestation, the invention is an animal trap. A base operatively rests upon a support and defines a fixed jaw. A moving jaw is above and pivotally coupled with the fixed jaw. A spring is engaged with the fixed jaw and distal thereto is engaged with the moving jaw. The spring is adapted to operatively apply a closure force to move the moving jaw towards the fixed jaw when the moving jaw is in at least a first position. A trigger is located between the moving jaw and fixed jaw, to selectively trigger application of the closure force responsive to being activated by the animal. A pivotal axis runs between the fixed jaw and moving jaw. The spring in a first position passes on a first side of the pivotal axis, pulling the fixed jaw and moving jaw apart from each other. In a second position the spring passes on a second side of the pivotal axis opposed to the pivotal axis first side and is operative to pull the fixed jaw and moving jaw together. An adjuster between the base and step trigger sets the relative location of the spring relative to the pivotal axis and thereby controls a force required for a transition of the spring from the spring first position to the spring second position.

In a third manifestation, the invention is an animal trap. A base operatively rests upon a support and defines a fixed jaw. A moving jaw is above and pivotally coupled with the fixed jaw. A spring is engaged with the fixed jaw and distal thereto is engaged with the moving jaw. The spring is adapted to operatively apply a closure force to move the moving jaw towards the fixed jaw when the moving jaw is in at least a first position. A step trigger is located between the moving jaw and fixed jaw, to selectively trigger application of the closure force responsive to being stepped upon by the animal. The step trigger has a platform and a plurality of posts rising from said platform.

OBJECTS OF THE INVENTION

Exemplary embodiments of the present invention solve inadequacies of the prior art by providing a fixed jaw that serves as a base, and an opposed moveable jaw that operatively closes down upon the base. A trigger is provided adjacent to the base. A bait holder is provided within the moveable jaw, most preferably at a location that requires a rodent or other animal to step upon the trigger while both raising their head and twisting their neck to attempt to reach the bait. This physical contortion prevents the rodent from being able to spring away from the moveable jaw. To further delay the rodent, the trigger may be covered with a set of posts that are sized to prohibit any flat placement of paws onto the trigger, thereby forcing the rodent to grip onto a post top.

The present invention and the preferred and alternative embodiments have been developed with a number of objectives in mind. While not all of these objectives are found or required in every possible embodiment, these objectives nevertheless provide a sense of the general intent and the many possible benefits that are available from embodiments of the present invention.

A first object of the invention is to provide a mechanical trap that is safe to use and harmless to a person even if a finger is accidentally trapped. A second object of the invention is to only require single-handed squeezing to set and release a preferred trap, thereby reducing the amount of manual dexterity required to set and empty the trap. As a corollary, this hands-off removal of a rodent carcass will preferably be achieved with hands as far from the rodent carcass as possible. Another object of the present invention related thereto is to provide simple and intuitive trap set-up and use. A further object of the invention is to optimize trap actuation time to increase the likelihood of animal capture. Yet another object of the present invention is to also provide rapid termination of the animal, making a preferred trap both quick and relatively more humane. Another object of the invention is to achieve sanitary blood-free termination, which helps to minimize human exposure to diseases that might be carried by the rodent. A further object of the invention is to provide a trap that offers some size selectivity and which thereby does not affect larger or smaller animals than the trap is sized for. Yet another object of the invention is to provide easily adjusted trap sensitivity that may be selective to a targeted animal species, and also that may be adjusted to compensate for manufacturing tolerances and later for worn or damaged components. A further object of the present invention is to provide over-head bait that requires a rodent to twist and lift their head, thereby rendering the rodent unable to spring in response to sudden trap movement. An additional object of the present invention is to inhibit a rodent from springing away from an activated trap, by providing a paw support that acts as a trigger, and which will cause the rodent foot to slip from posts with sudden movement. The foregoing objectives will preferably be achieved with relatively few piece parts to facilitate low cost construction and allowing disposal when a person deems appropriate.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which.

DESCRIPTION OF THE PREFERRED EMBODIMENT

Figure 1:
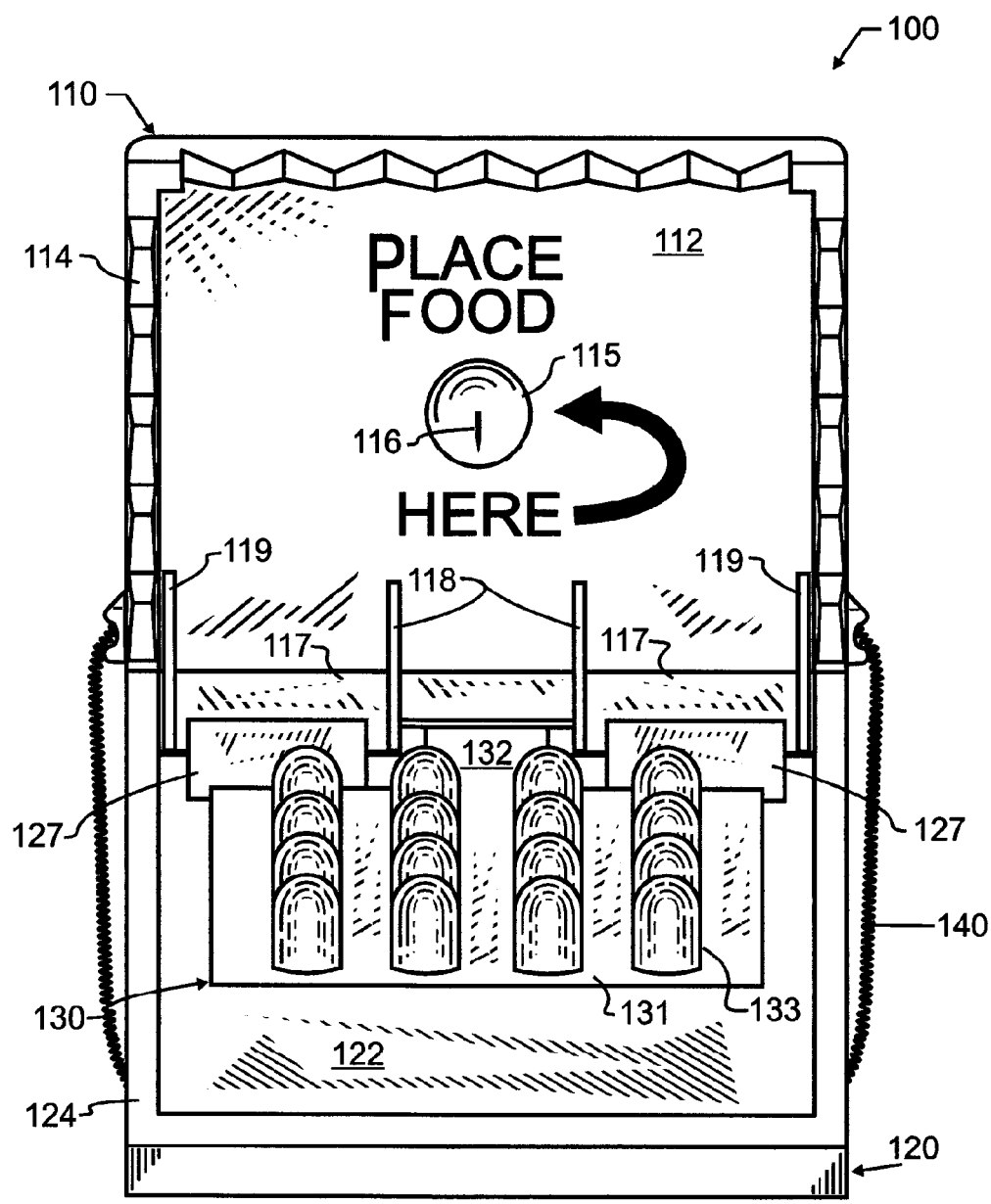
FIG. 1 illustrates a preferred embodiment animal trap designed in accord with the teachings of the present invention from a front projected view.

Manifested in the preferred embodiment, the present invention provides an animal trap 100 that comprises four major components, including: an upper moving jaw 110; a lower fixed jaw 120 that serves as a base pivotally coupled with upper moving jaw 110; a step trigger 130 located between moving jaw 110 and fixed jaw 120 to selectively trigger application of a closure force responsive to being stepped upon by the animal; and a spring 140 engaged with fixed jaw 120 and distal thereto engaged with moving jaw 110 adapted to operatively apply a closure force to drive moving jaw 110 towards fixed jaw 120. Animal trap 100 achieves extremely high trap rates with relatively few piece parts, which facilitates low cost construction and allows for disposal and replacement when a person deems appropriate. Furthermore, animal trap 100 provides simple and intuitive trap set-up and use, again owing at least in part to the few piece parts.

When a rodent or similar other animal is pursuing bait, the rodent will step upon step trigger 130. Since rodents such as mice and rats have a mouth below an extended nose, they will be both raising their head and twisting their neck to reach the bait with their mouth or paw. At the same time, they will be pushing down upon step trigger 130. The weight of the rodent's paw or paws upon step trigger 130 will trigger movement of moving jaw 110 towards fixed jaw 120. The physical contortion of the raised head and twisted neck, which also causes the rodent to extend limbs, prevents the rodent from being able to spring away from moving jaw 110.

Animal trap 100 has been illustrated using many features found in prior art traps sold by Intruder, Incorporated of Rice Lake, Wisconsin under the tradenames "The Better Mousetrap" and "The Better Rodentrap", the teachings of which are incorporated herein by reference. This will facilitate the description of the present invention and preferred and alternative embodiments. However, to be clear, while the features found in these prior art Intruder, Incorporated traps are preferred, they are not essential to the present invention, and many of the jaw-type traps incorporated by reference herein above may also be adapted to cooperate with the features and teachings of the present invention.

Upper moving jaw 110 may preferably have a generally planar surface or cover 112, which in the preferred embodiment is a solid sheet. The use of a solid sheet ensures that there will be slightly more limited access to step trigger 130, while also providing a more easily cleaned surface than a perforate surface would. In addition, cover 112 tends to obscure an animal carcass when animal trap 100 has been activated, such that a person releasing the carcass will not be forced to partake in close visual inspection. However, the invention is not limited solely to an imperforate cover 112, and any structure suitable to couple the remaining components will be considered to be incorporated herein.

Bordering cover 112 is a toothed rim 114. The formation of teeth is not essential to the present invention, and instead the jaw may be smooth, such as illustrated in the Evans and Slutz patents incorporated by reference herein above. Nevertheless, formation of at least minor teeth is felt to offer better retention of an animal during trap activation, and so is preferred. The extent of displacement of rim 114 away from the generally planar surface defined by cover 112 will be dependent upon the size of the target animal to be trapped. For exemplary purposes, rats are much larger than mice, and so rim 114 will likewise be larger when rats are the target of animal trap 100. As may be apparent, too small a displacement will allow larger animals to escape the trap. This is beneficial to the selectivity of animal trap 100, helping to protect larger domestic pets from harm by a trap designed for mice, voles and shrew.

Within the borders of cover 112, and preferably centered and slightly indented therein, is a bait support 115. An optional pin 116 having a sharpened point may be provided to hold solid bait, while peanut butter and similar sticky substances may simply be pressed into bait support 115. Pin 116 is explicitly not intended to penetrate an animal's skin, and so pin 116 will preferably not extend consequentially from the surface of cover 112 towards fixed jaw 120.

Figure 2:
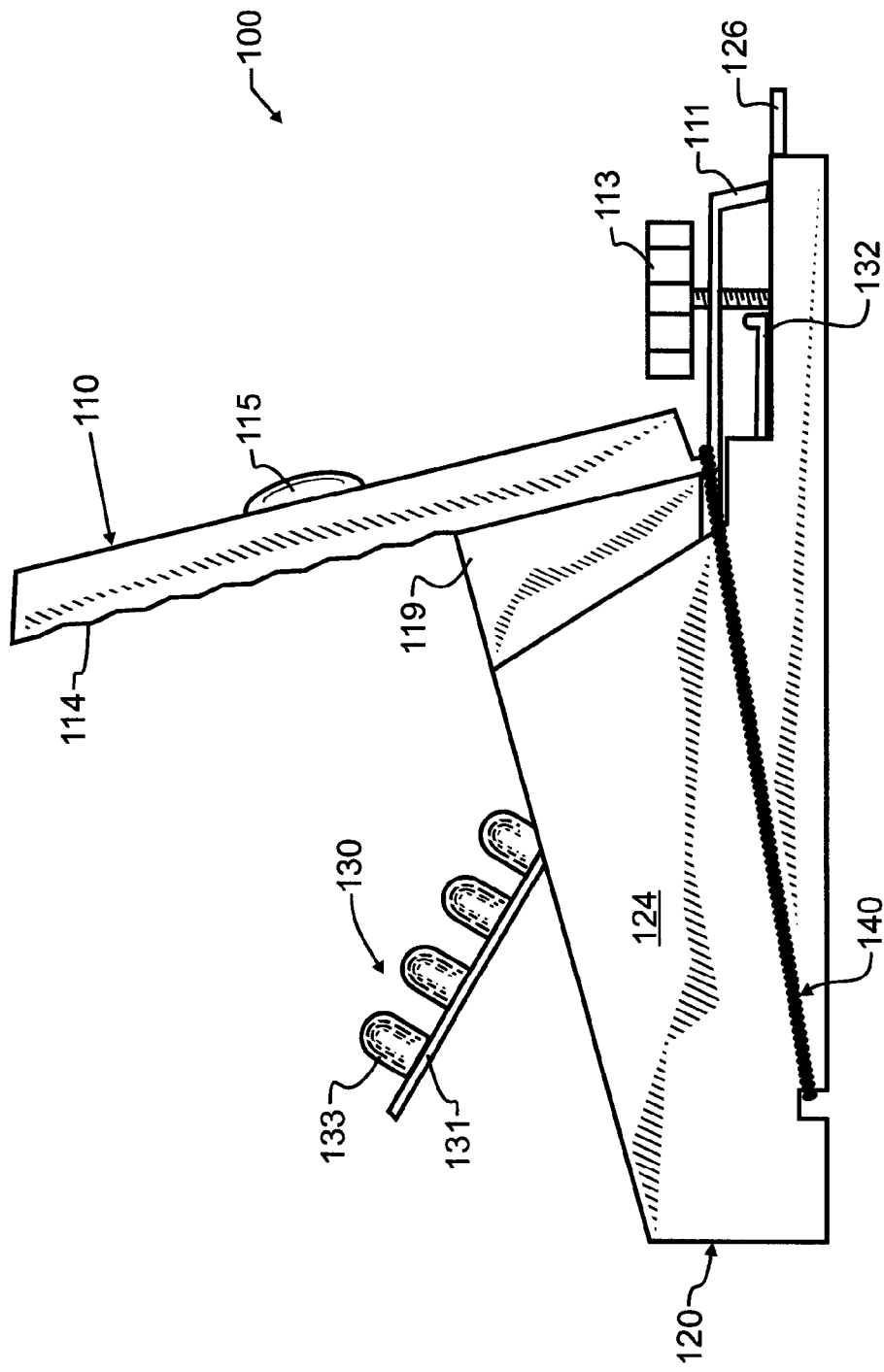
FIG. 2 illustrates the preferred embodiment animal trap of FIG. 1 from a side elevational view in a set position.

A set of pivotal blades 117 are provided, and optional structural ribs 118 may provide additional strength between pivotal blades 117 and cover 112. A set of blocking ribs 119 preferably provide both structural support and also provide a physical barrier to an animal trying to enter an open animal trap 100 from the sides edges adjacent to pivotal blades 117, as best illustrated in FIG. 2.

Fixed jaw 120 has a bottom 122 which is functionally and structurally similar to cover 112, and for the same reasons may preferably be fabricated from a smooth and solid sheet. A rim 124 is preferably cooperative with toothed rim 114, and may be either toothed or smooth. As with toothed rim 114, rim 124 will preferably not be so aggressive as to puncture a trapped animal, but will preferably adequately retain a struggling trapped animal with an adequate spring force applied there between. The selection of a particular tooth geometry or a smooth rim will be made with the objective to achieve a sanitary blood-free termination, which helps to minimize human exposure to diseases that might be carried by a rodent. In addition, a less aggressive tooth geometry will provide a mechanical trap that is safe to use and harmless to a person even if a finger is accidentally trapped.

Adjacent to pivotal blades 117 are stop plates 127 which rise from bottom 122. Spring 140 draws upper moving jaw 110 towards the front of fixed jaw 120, which is the left end as illustrated in FIG. 2. This causes pivotal blades 117 to engage with stop plates 127, limiting the extent of movement of moving jaw 110 towards the front of fixed jaw 120. Furthermore, the edges of pivotal blades 117 engaging stop plates 127 act as a pivot and define a pivotal axis between upper moving jaw 110 and fixed jaw 120.

While these edges of pivotal blades 117 provide an adequate pivot, upper moving jaw 110 should move smoothly, without bumps and jerks that might signal to or forewarn the rodent that animal trap 100 is active. One way to achieve this is to reduce the pivot point to a sharp edge, point or even a bushing or jewel bearing, to reduce sticking and drag, though there are many other ways well known in the mechanical arts. These known alternatives are considered to be incorporated herein, as are those illustrated in the moving jaw patents incorporated by reference herein above.

Intermediate between upper moving jaw 110 and fixed jaw 120 is step trigger 130, the particular size or outline which is not critical to the working of the present invention. Preferably, platform 131 of step trigger 130 will consume a significant portion of the surface area of bottom 122, or will alternative act as a partial barrier to bait support 115. In either case, the objective is to force an animal to step onto step trigger 130 in order to reach bait support 115. Most preferably, step trigger 130 will not trigger from gentle vibrations or light brushing contact with an animal. This helps to ensure that animal trap 100 will not prematurely trigger, and will instead once again be somewhat more specific to a particular animal that animal trap 100 is designed for. Desirably, the animal will have the opportunity to start reaching up and rotating to move its mouth or paw closer to bait support 115 prior to activating step trigger 130. For the animal to want to move its mouth towards bait support 115, bait support 115 will preferably either face or open towards step trigger 130.

To further delay an animal, platform 131 of step trigger 130 may optionally but preferably be covered with a set of posts 133 that are sized to prohibit any flat placement of a target animal's paws onto the trigger, thereby forcing the animal to grip onto a post 133 domed top. Forcing the animal to balance on and grasp the top of these posts 133 is believed to help inhibit a rodent from springing away from an activated trap, by activation of gripping muscles that must first be released, by possible reduction of the animal's fright and flight response, and by greatly increasing the chance that one or more rodent paws will slip from posts 133 with sudden movement and potentially get stuck between posts 133. Preferably, the spacing between adjacent posts 133 is slightly less than the diameter of each individual post 133. This helps to ensure that a rodent paw large enough to grasp a post 133 top will not be able to be placed flat onto platform 131 between any of posts 133. As may be apparent, where posts 133 are provided, such as in preferred embodiment animal trap 100, additional size selectivity is afforded to correspond to the paw sizes of the animal.

Posts 133 will also reduce the available internal space within animal trap 100 when moving jaw 110 snaps down onto fixed jaw 120. This can effectively collapse the lungs of a rodent captured therein, more quickly and humanely leading to the animal's demise. In contrast, rodents captured in prior art traps may continue to breath and be held for much longer time periods.

While posts 133 are illustrated, it will be apparent that any geometry may be used, including eliminating posts 133 altogether, and that the objective is spaced elevation changes where the tops do not support an entire animal paw, and that the spaces are great enough to allow the animal paw to slip and preferably get stuck between adjacent tops.

Extending from step platform 131 is a lever arm 132. Intermediate along lever arm 132 are pins 134, which may for exemplary purpose pass through openings in bottom 122, such as adjacent to recesses 123 visible in FIG. 4. Pins 134 define an axis of pivot for step trigger 130, about which step trigger 130 can rotate in a see-saw like fashion. Referring to FIG. 2, when animal trap 100 is set and baited, step platform 131 will be raised above bottom 122. When an animal steps thereon, such as onto the tops of posts 133, then step platform 131 will lower. In turn, the end of lever arm 132 distal to step platform 131 will raise and lift arm 111. This in turn causes upper moving jaw 110 to pivot from the position illustrated in FIG. 2 towards the position illustrated in FIG. 3, activating the trap to capture an animal between upper moving jaw 110 and fixed jaw 120. As long as spring 140 remains below the edge of pivotal blades 117 engaged with stop plates 127, spring 140 urges animal trap 100 towards the open position illustrated in FIG. 2. However, when lever arm 132 pushes lift arm 111 upward, at some point spring 140 will pass over immediately adjacent to the pivotal axis created by pivotal blades 117 interacting with stop plates 127. Further rotation will raise spring 140 above this pivotal axis, causing spring 140 to continue to draw upper moving jaw 110 down towards fixed jaw 120 to the position illustrated in FIG. 3. With this over-center construction, the closure force generated by spring 140 increases as animal trap 100 closes. This helps to provide rapid termination of the animal, making a preferred trap both quick and relatively more humane.

Once the animal has been trapped, a person may hold onto animal trap 100 adjacent to hanger 126, which is provided for anchoring of animal trap 100 onto a support, retail display, and other suitable use. Single-handed squeezing of lift arm 111 towards hanger 126 will reset animal trap 100, and may also be used for hands-off removal of a rodent with hands as far from the rodent carcass as possible. This reduces the amount of manual dexterity required to set and empty the trap when compared to traps using a catch.

The force required to make this transition from spring 140 holding animal trap 100 open to spring 140 forcibly closing animal trap 100 may be adjusted using hand screw 113. Raising lift arm 111 upward using hand screw 113 will bring spring 140 closer to the transition. Closer to the transition, smaller forces are required to move upper moving jaw 110. Consequently, raising lift arm 111 reduces the requisite trigger force. This allows a person to adjust animal trap 100 to work with different animals. One particularly difficult animal to trap with prior art traps is the shrew, owing to the small size and light weight of the shrew. However, the preferred embodiment animal trap 100 may be adjusted to a light trigger to successfully trap the shrew.

Over time, various components may wear or weather, which may also alter the trigger force required to activate animal trap 100. Furthermore, manufacturing of components is never perfect, and due to manufacturing tolerances, different traps will have different activation forces. Consequently, hand screw 113 may be used to easily adjusted trap sensitivity selective to a targeted animal species, and also may be adjusted to compensate for manufacturing tolerances and later for worn or damaged components.

Figure 4:
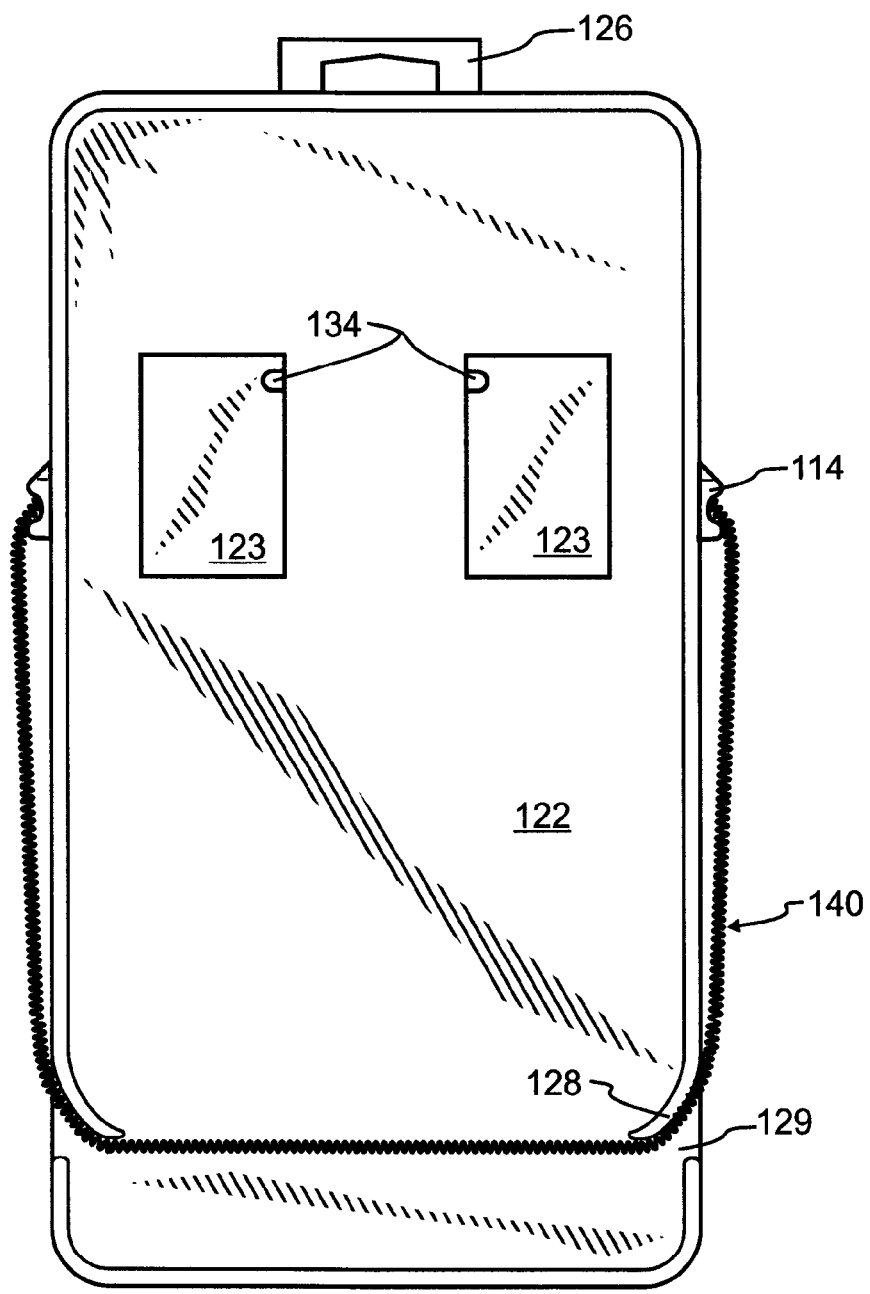
FIG. 4 illustrates the preferred embodiment animal trap of FIG. 1 from a bottom plan view.

FIG. 4 illustrates the bottom of animal trap 100, showing that in one embodiment toothed rim 114 may optionally extend beyond the edge of rim 124, preferably only adjacent to lift arm 111. This allows spring 140 to move freely, and not slide along the edges of either rim 114 or rim 124. Once again, this may be beneficial to provide a smoother trap operation that does not forewarn an animal, and to avoid drag that might slow down trap response, thereby giving the animal less time to escape. Additionally, guides 128 through openings 129 may also be curved or gently radiused to smoothly guide spring 140, and to thereby avoid kinks or undesirable interference.

Figure 3:
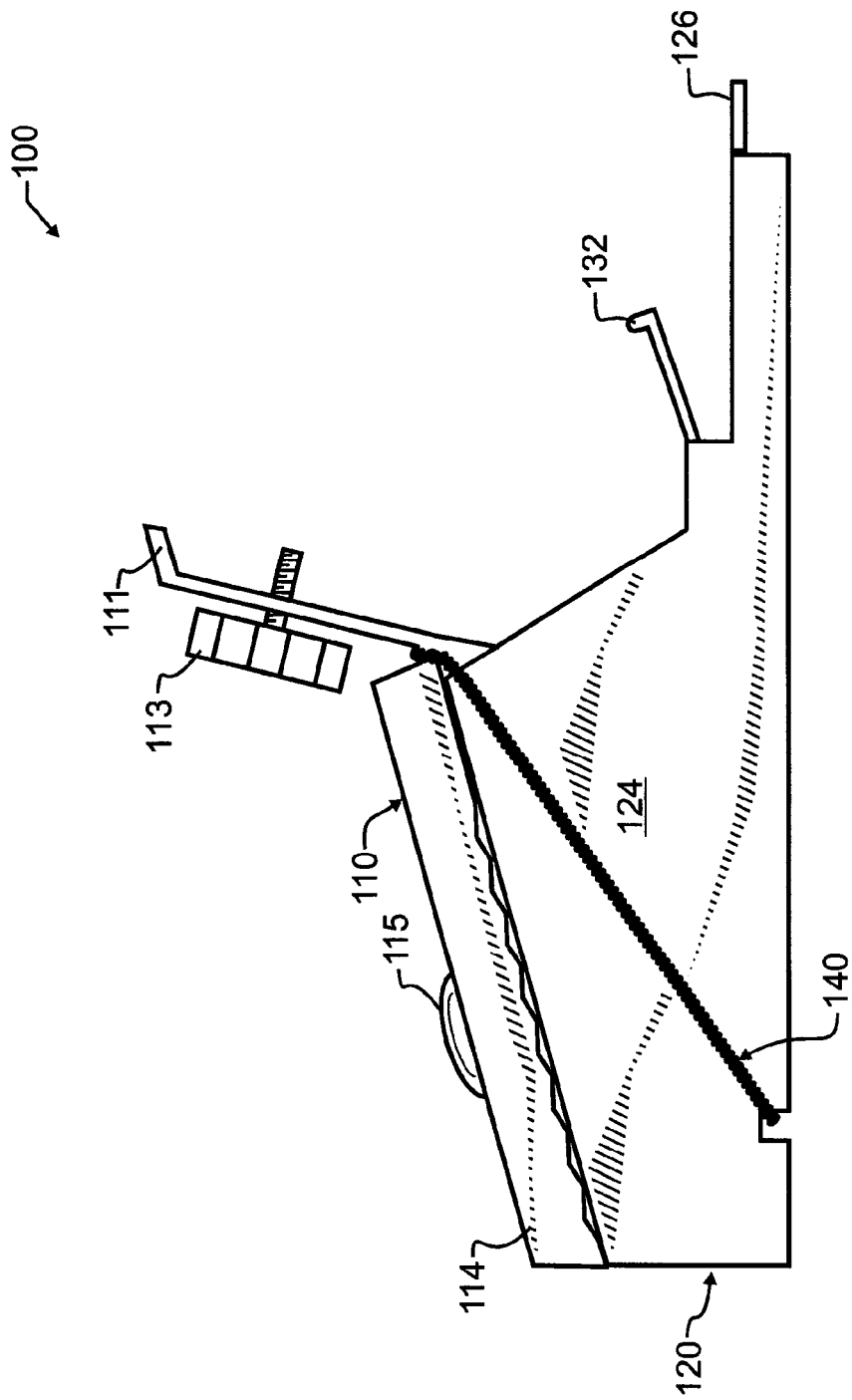
FIG. 3 illustrates the preferred embodiment animal trap of FIG. 1 from a side elevational view in a closed or actuated position.
Figure 5:
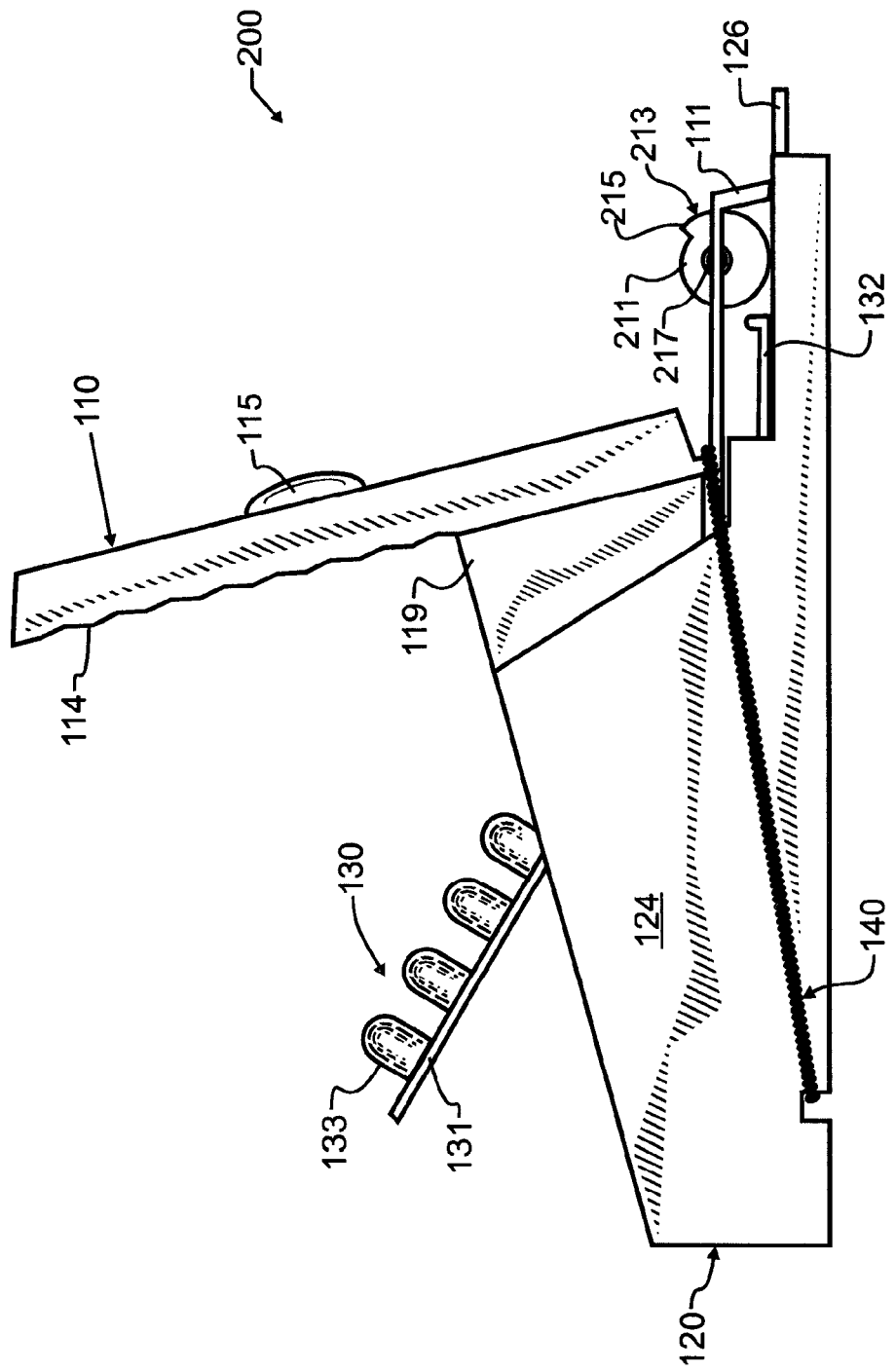
FIG. 5 illustrates an alternative embodiment animal trap from a side elevational view in a closed position similar to that of FIG. 3, but with an eccentric wheel provided as an alternative to the thumb screw used in the preferred embodiment animal trap of FIG. 1.

FIG. 5 illustrates an alternative embodiment animal trap 200 in a closed position similar to that of FIG. 3, but with an eccentric wheel 213 provided as an alternative to thumb screw 113 used in the preferred embodiment animal trap 100 of FIGS. 1-4. The embodiments of animal trap 100 and animal trap 200 are distinguished by the hundreds digit, and various components within each embodiment designated by the ones and tens digits. However, many of the components are alike or similar between embodiments, so numbering of the ones and tens digits have been maintained wherever possible or numbering eliminated entirely, such that identical, like or similar functions may more readily be identified between the embodiments. If not otherwise expressed, those skilled in the art will readily recognize the similarities and understand that in many cases like numbered ones and tens digit components may be substituted from one embodiment to another in accord with the present teachings, except where such substitution would otherwise destroy operation of the embodiment. Consequently, those skilled in the art will readily determine the function and operation of many of the components illustrated herein without unnecessary additional description.

Eccentric wheel 213 as illustrated has a pintle 217 or equivalent about which wheel 213 may spin, preferably in a controlled manner and only with manually applied force. This allows animal trap 200 to be adjusted by spinning eccentric wheel 213 from either a small radius at 211 to a large radius at 215. The exact shape of eccentric wheel 213 can be varied to desired activation force versus degrees of rotation, if so desired. As may be apparent, any apparatus that may be used to alter the spacing between lift arm 111 and hanger 126 known in the mechanical arts and reasonably adapted to be cooperative with the present invention will be considered to be incorporated herein.

While the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims hereinbelow.

I claim:

1. An animal trap, comprising:
    a base operatively resting upon a support and defining a fixed jaw;
    a moving jaw above and pivotally coupled with said fixed jaw;
    a spring engaged with said fixed jaw and distal thereto with said moving jaw and adapted to operatively apply a closure force to move said moving jaw towards said fixed jaw when said moving jaw is in at least a first position;
    a step trigger between said moving jaw and said fixed jaw to selectively trigger said closure force responsive to being stepped upon by said animal; and
    a bait support coupled with said moving jaw and facing said step trigger;
    wherein said bait support is unitary with said moving jaw.

2. The animal trap of claim 1, wherein said step trigger further comprises a platform and a plurality of posts rising from said platform.

3. The animal trap of claim 2, wherein a spacing between adjacent posts is less than a diameter of an individual post.

4. The animal trap of claim 2, wherein at least an individual one of said plurality of posts further comprises a domed top.

5. The animal trap of claim 1, wherein said step trigger is adjacent to said base.

6. The animal trap of claim 1, wherein said bait support further comprises a dome generally centered within said moving jaw.

7. The animal trap of claim 6, further comprising a solid food support pin centered within said dome.

8. An animal trap, comprising:
    a base operatively resting upon a support and defining a fixed jaw;
    a moving jaw above and pivotally coupled with said fixed jaw;
    a spring engaged with said fixed jaw and distal thereto with said moving jaw and adapted to operatively apply a closure force to move said moving jaw towards said fixed jaw when said moving jaw is in at least a first position;
    a trigger between said moving jaw and said fixed jaw to selectively trigger said closure force responsive to being activated by said animal;
    a pivotal axis between said fixed jaw and said moving jaw, said spring in a first position passing on a first side of said pivotal axis pulling said fixed jaw and said moving jaw apart, and in a second position passing on a second side of said pivotal axis opposed to said pivotal axis first side operative to pull said fixed jaw and moving jaw together; and
    an adjuster between said base and said trigger that sets the relative location of said spring relative to said pivotal axis in said first position and thereby controls a force required for a transition of said spring from said spring first position to said spring second position.

9. The animal trap of claim 8, wherein said adjuster further comprises a thumb screw threaded through said trigger.

10. The animal trap of claim 8, wherein said adjuster further comprises an eccentric wheel between said trigger and said base.

11. The animal trap of claim 8, further comprising a bait support coupled with said moving jaw and facing said step trigger.

12. An animal trap, comprising:
    a base operatively resting upon a support and defining a fixed jaw;
    a moving jaw above and pivotally coupled with said fixed jaw;
    a spring engaged with said fixed jaw and distal thereto with said moving jaw and adapted to operatively apply a closure force to move said moving jaw towards said fixed jaw when said moving jaw is in at least a first position;
    a step trigger between said moving jaw and said fixed jaw to selectively trigger said closure force responsive to being stepped upon by said animal;
    a bait support coupled with said moving jaw and facing said step trigger;
    a pivotal axis between said fixed jaw and said moving jaw, said spring in a first position passing on a first side of said pivotal axis pulling said fixed jaw and said moving jaw apart, and in a second position passing on a second side of said pivotal axis opposed to said pivotal axis first side operative to pull said fixed jaw and moving jaw together; and
    an adjuster between said base and said step trigger that sets the relative location of said spring relative to said pivotal axis in said first position and thereby controls a force required for a transition of said spring from said spring first position to said spring second position.

13. The animal trap of claim 12, further comprising a pair of blocking ribs affixed on distal surfaces of said moving jaw adjacent to said pivotal axis and extending therefrom towards said fixed jaw and adapted to operatively provide structural support and also provide a physical barrier to an animal trying to enter said animal trap from a side edge adjacent to said pivotal axis.

14. An animal trap, comprising:
    a base operatively resting upon a support and defining a fixed jaw;
    a moving jaw above and pivotally coupled with said fixed jaw;
    a spring engaged with said fixed jaw and distal thereto with said moving jaw and adapted to operatively apply a closure force to move said moving jaw towards said fixed jaw when said moving jaw is in at least a first position;

a step trigger between said moving jaw and said fixed jaw to selectively trigger said closure force responsive to being stepped upon by said animal; and a bait support coupled with said moving jaw and facing said step trigger;

wherein said moving jaw is wider adjacent to said spring than an adjacent portion of said fixed jaw, whereby said spring moves freely.

\* \* \* \* \*